Figures 1, 2:
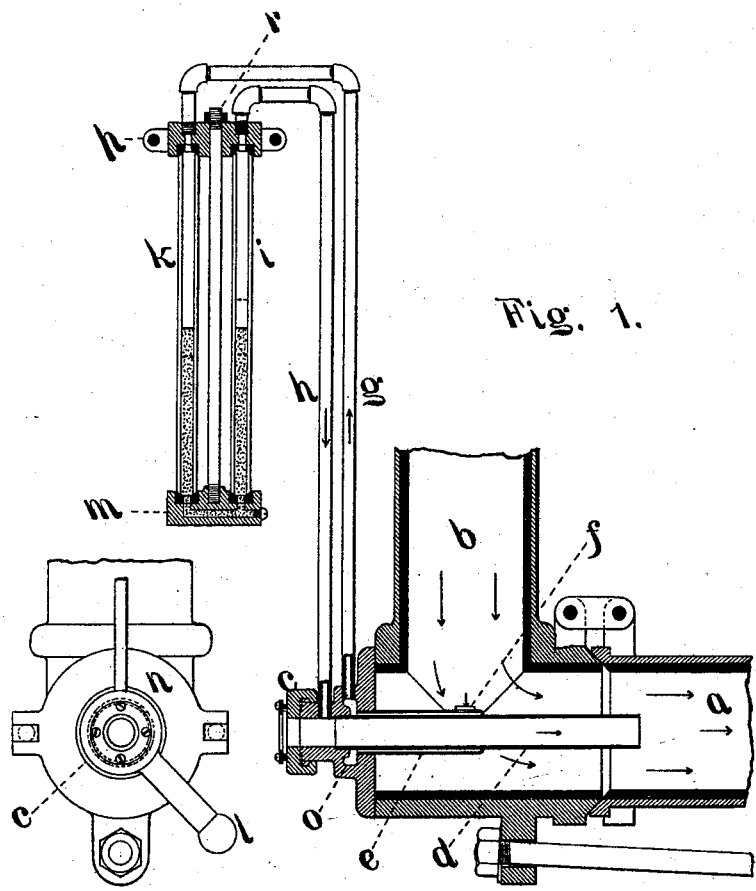

(No Model.)

T. SHAW.
INDICATOR FOR FURNACE TUYERES.

No. 364,050. Patented May 31, 1887.

WITNESSES:
J. Logan Fitts
Geo. J. Henninger.

T. Shaw.
INVENTOR

United States Patent Office.

THOMAS SHAW, OF PHILADELPHIA, PENNSYLVANIA.

INDICATOR FOR FURNACE-TUYERES.

SPECIFICATION forming part of Letters Patent No. 364,050, dated May 31, 1887.

Application filed February 12, 1887. Serial No. 227,362. (No model.)

*To all whom it may concern:*

Be it known that I, THOMAS SHAW, of the city and county of Philadelphia, Pennsylvania, have invented a new and Improved Indicator for Furnace-Tuyeres, &c.; and I hereby declare the following to be a full, clear, and exact description of the same, reference being had to the accompanying drawings, and to the letters of reference marked thereon.

My invention consists in the construction and arrangement of pneumatic tubes and passage-ways combined with the tuyere, and in the construction of the indicator and mode of operating the same without throwing extra burden upon the engine.

The object of the invention is to give intelligible notice of the amount of blast passing to the furnace and the changes of quantities as they occur at the tuyeres without any extra labor on the blast-engine.

In order to enable others to use and practice my invention, I will proceed to describe its construction and operation.

On reference to the accompanying drawings, which form part of this specification, Figure 1 is a vertical section through center of apparatus, and Fig. 2 an end view of the same.

*a* represents the outer end of tuyere-pipe connected with metal elbow *b*, through which pass the air-blast currents in the direction indicated by arrows.

*n* is a cast-iron cap covering the outer end of metal elbow *b*, and secured in place by ordinary bolts. Said cap is provided with an annular recess, *o*, that communicates with annular passage-way between tubes *e* and *d* and through the opening *f* with said air-blast in a direction to cause the air-blast to blow into said opening, causing an increase of pressure in pipe *g*, leading to indicator. Tube *d* connects with air-blast at its inner end, where the air-blast is caused to blow away from the mouth of said pipe, causing a diminished pressure or partial vacuum in tube *h*, that connects with the same and the indicator. The said tubes *e* and *d* are located concentrically with tuyere-pipe, to permit a sight-aperture through the central tube. The outer end of said sight-aperture is provided with a glass covering secured in metallic cap *c*, which cap is secured in place by ordinary screw-thread, and, for convenience of ready attachment, is provided with a handle, *l*.

The indicator is constructed of separate heavy glass tubes *k* and *i*, secured in position at the bottom by a metal base, *m*, that has a bored passage-way (shown) to establish communication between the two glass tubes, and is provided with a metal top, *p*, to secure the said glass tubes in position, and is provided with threaded passage-ways to connect with tubes *h* and *g*. The ends of said glass tubes are provided with rubber packing-rings to insure a tight joint with the metallic connections, and the whole is held firmly in place by bolt *r*. This form of indicator permits the use of fluids to indicate moderate pressures, the same as in the ordinary bent glass tubes of U configuration, with the advantage of permitting the use of heavy annealed glass tubes, less liable to fracture, and permitting a constant distance between centers. This construction is of a durable character and permits quick repairs when necessary, as the several parts can be held in exact duplicate, and the strains upon the glass tubes are not of a character to destroy the same. The apparatus is operated in this wise: The described indicator is filled for one-half of its glass-tube length with mercury or other fluids, according to pressures, &c.

When no current of air-blast exists in the tuyere-pipe *a*, the pressures in pipes *h* and *g* are the same, and the fluid surface in the indicator stands level as a consequence; but when a current of air-blast is caused to pass through said tuyere the effect of said current is to create a partial vacuum in tube *d* and to increase the pressure slightly in the annular passage-way *e*, which alteration in pressures is transmitted to the fluid in indicator through the tubes *h* and *g*, depressing the surface of the fluid in tube *k* and elevating the surface in tube *i* more or less, according to the velocity of the passing air, regardless of the pressure of the blast. When the tuyere is closed or partially closed at the mouth by cinders, &c., the effect is to reduce the velocity of the current, which, with its consequent effect on the fluid surfaces of the indicator, indicates the result upon the furnace. The indicator is set to the wants of each furnace by a predetermined scale or actual test, at the option of the operator. The concentric location in tuyere permits the admission of a sight-hole, desirable in furnaces. The same appliance is applicable to steam, air, or gas as a comparative measure of approximate quantities, and is highly useful to maintain that balance of two or more streams, such as are required in and about furnace-work.

This device is fully competent to measure in the manner indicated without any choking of the current or other frictional resistance which throws extra load upon the blast-engine. It is evident that the several parts can be modified in form and location without any alteration in the result, and also that the invention is applicable as well to other moving bodies of air or fluid as to the current in a furnace-tuyere.

What I claim, and desire to secure by Letters Patent, is—

1. The combination, with a blast-pipe and an indicator, of pressure and partial-vacuum tubes arranged concentrically and situated in the blast-pipe and connected with the two arms of the indicator, substantially as described.

2. The combination, with a blast-pipe and an indicator, of two concentrically-arranged tubes situated within said pipe, the inner tube opening in the direction of the blast and being connected with one arm of the indicator, and the outer tube being open to the force of the blast and connecting with the other tube of the indicator, substantially as described.

3. The combination, with an angular blast-pipe, $a\,b$, and an indicator, of a tube connecting with one arm of the indicator and having an opening, $f$, opposite the current in pipe $b$, and another tube connecting with the other arm of the indicator, extending into pipe $a$, and opening in the direction of the blast, substantially as described.

4. The combination, with a blast-pipe and an indicator, of the concentrically-arranged pressure and partial-vacuum tubes extending into the blast-pipe, pipes $g\,h$, connecting said tubes, respectively, with the two arms of the indicator, a cap covering an opening into the blast-pipe, and in which tubes $g\,h$ and the pressure and partial-vacuum tubes are inserted and provided with separate passageways connecting tubes $g\,h$ with their respective pressure and partial-vacuum tubes, substantially as described.

5. The combination, with an angular blast-pipe and an indicator, of cap $c$, covering the end of the pipe at its angle, the concentrically-arranged pressure and partial-vacuum tubes supported centrally in said cap and projecting into the blast-pipe, connecting-tubes $g\,h$, and a transparent covering for an opening in the cap opposite the ends of said concentric tubes, substantially as and for the purposes set forth.

THOMAS SHAW.

Witnesses:
J. LOGAN FITTS,
GEO. J. HENNINGER.